G. SMITH.
Hand Plow.
No. 52,083.
Patented Jan. 16, 1866.
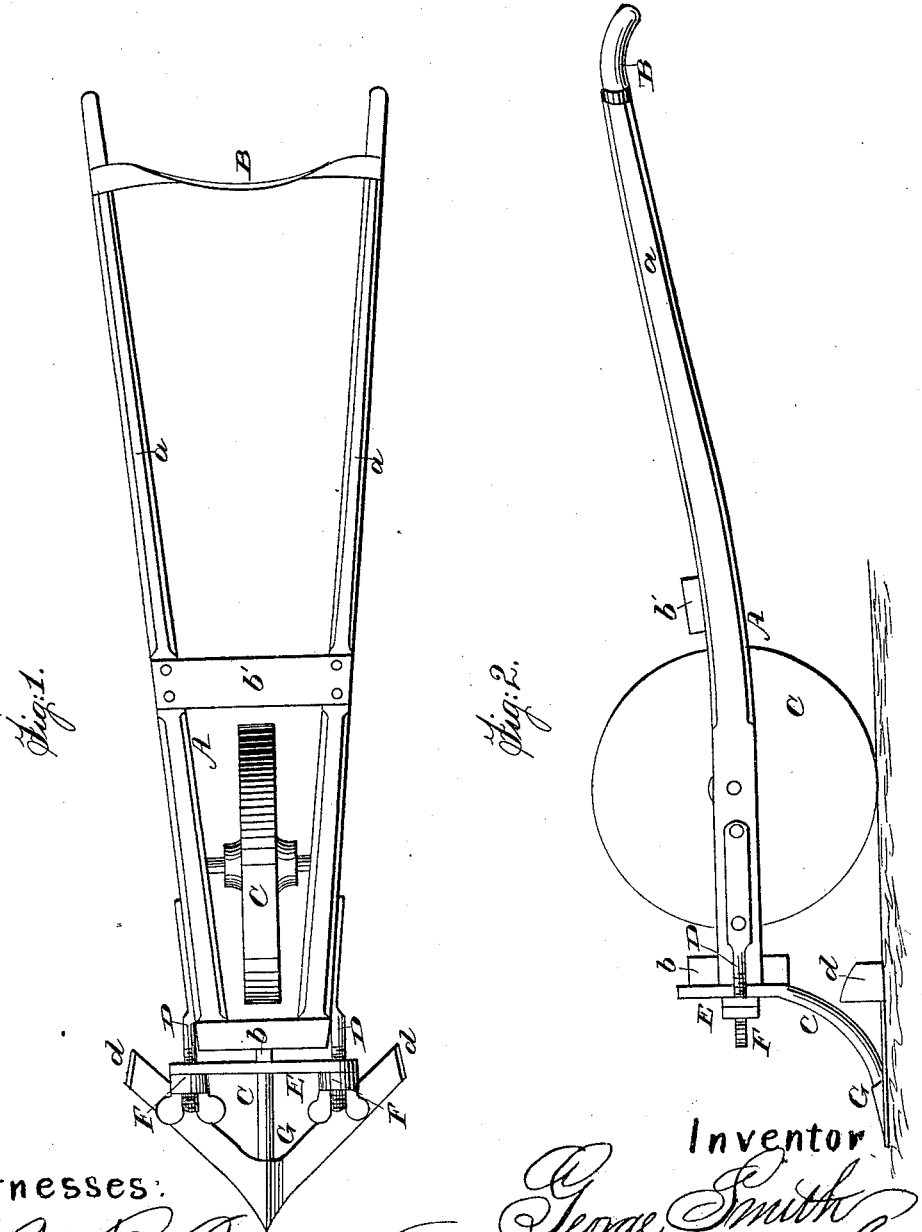
Witnesses:
Inventor

UNITED STATES PATENT OFFICE.

GEORGE SMITH, OF OMAHA CITY, NEBRASKA TERRITORY.

IMPROVEMENT IN HAND-CULTIVATORS.

Specification forming part of Letters Patent No. 52,083, dated January 16, 1866.

*To all whom it may concern:*

Be it known that I, GEORGE SMITH, of Omaha City, in the county of Douglas and Territory of Nebraska, have invented a new and Improved Plow or Cultivator; and I do hereby declare that the following is a full, clear, and exact description thereof, which will enable those skilled in the art to make and use the same, reference being had to the accompanying drawings, forming part of this specification, in which—

Figure 1 is a plan or top view of my invention; Fig. 2, a side view of the same; Fig. 3, a detached perspective view of a plow pertaining to the same.

Similar letters of reference indicate corresponding parts.

This invention relates to a new and improved plow or cultivator, designed to be shoved along by the operator, and to supersede the use of the ordinary hoe and other hand implements now employed for cultivating those crops which are grown in drills or hills.

The invention consists in the employment or use of a frame in which a wheel is placed, the frame provided with handles, or its sides extended or elongated so as to form handles, and provided at its front end with a clamp arranged in such a manner as to admit of different kinds of hoes or plows being attached, as the nature of the work may require, and also to admit of said hoes or plows being adjusted higher or lower, or more or less to the right or left, to suit circumstances.

A represents the frame of the device, composed of two side pieces, *a a*, connected by cross-bars *b b'*, said side pieces being of such a length and curved so as to form handles, which may have a strap, B, attached to them near their outer ends, for the breast of the operator to bear against in shoving the machine along. This frame A has a wheel, C, fitted in it near its front end to support the front part of the machine, and to each side of the frame A, at its front end, there is attached a screw-rod, D, on which a bar, E, is fitted loosely, said bar being parallel with the front cross-bar, *b*, of the frame A, as shown clearly in Fig. 1. The screw-rods D D have thumb-nuts F fitted on them at the outer side of the bar E, and this bar E, in connection with the screw-rods D, thumb-nuts F, and the front cross-bar, *b*, of the machine, constitute a clamp to secure the hoes or plows to the front end of the frame A.

In Figs. 1 and 2 a hoe, G, is shown attached to the frame A. This hoe is of V form, as shown clearly in Fig. 1, and it is provided with a shank or standard, *c*, which extends from the rear of the front part or point of the hoe, and is curved so as to project upward and have a vertical position at its upper part, which part is held between the bars E *b*, the former being pressed up against the shank or standard *c* by screwing up the nuts F. The rear ends of the hoe G are bent or curved upward, as shown at *d*, and curved so as to slightly throw the earth inward and leave perceptible marks to serve as guides for the operator, and prevent rows of plants being cut up or accidentally hoed out, and the operator will be enabled to work quite close to the rows without the least danger of injuring them.

This device has been practically tested, and with a hoe cutting twelve inches more surface can be worked over in a given time than can be done with a team and plow, and more than can be performed by four men with ordinary hoes; and it will be seen that the shank or standard *c* may be adjusted more to the right or left between the bars E *b*, and also may be set horizontally or to any angle, the latter position being necessary in working by the sides of ridges, as in cultivating sweet potatoes, Irish potatoes, &c.

The strap B enables the operator to overcome resistance with but little effort. It relieves the arms from all but weight of the handles and enables him to apply his power from a point or part where it is most natural for a man to push.

Having thus described my invention, I claim as new and desire to secure by Letters Patent—

1. In combination with a frame, A, mounted on one or more wheels, C, and arranged so as to be shoved along by the operator, a clamp for holding the plow or hoe, composed of the nuts F, the bar E, placed on screw-rods D D, and having a parallel position with the front bar, *b*, of said frame A, substantially as shown and described.

2. The strap B, applied to the handles *a a* of the frame A, substantially as and for the purpose specified.

3. The hoe G, constructed in V form, in combination with the upright lips or projections *d* at its rear ends, substantially as and for the purpose specified.

GEO. SMITH.

Witnesses:
THOMAS RILY,
LORIN MILLER.